United States Patent
Clark et al.

(10) Patent No.: US 10,267,170 B2
(45) Date of Patent: Apr. 23, 2019

(54) TURBINE STATOR VANE ASSEMBLY FOR A TURBOMACHINE

(71) Applicant: ROLLS-ROYCE plc, London (GB)

(72) Inventors: Christopher J. Clark, Cambridge (GB); Graham Pullan, Cambridge (GB)

(73) Assignee: ROLLS-ROYCE plc, London (GB)

( * ) Notice: Subject to any disclaimer, the term of this patent is extended or adjusted under 35 U.S.C. 154(b) by 393 days.

(21) Appl. No.: 15/202,137

(22) Filed: Jul. 5, 2016

(65) Prior Publication Data

US 2017/0022835 A1  Jan. 26, 2017

(30) Foreign Application Priority Data

Jul. 21, 2015 (GB) .................................. 1512838.2

(51) Int. Cl.
*F01D 9/04* (2006.01)
*F01D 9/06* (2006.01)

(52) U.S. Cl.
CPC .............. *F01D 9/041* (2013.01); *F01D 9/06* (2013.01); *F01D 9/065* (2013.01); *F05D 2220/32* (2013.01); *F05D 2240/12* (2013.01); *F05D 2250/37* (2013.01); *Y02T 50/673* (2013.01)

(58) Field of Classification Search
CPC .............. F01D 5/14; F01D 9/041; F01D 9/06
See application file for complete search history.

(56) References Cited

U.S. PATENT DOCUMENTS

| 4,793,770 A | 12/1988 | Schonewald et al. |
| 7,234,914 B2 * | 6/2007 | Usab, Jr. ................. F01D 5/142 415/1 |
| 8,182,204 B2 * | 5/2012 | Durocher ................. F01D 9/06 415/115 |
| 2006/0024158 A1 | 2/2006 | Hoeger et al. |

(Continued)

FOREIGN PATENT DOCUMENTS

| EP | 942 150 A2 | 9/1999 |
| EP | 2 775 098 A2 | 9/2014 |

(Continued)

OTHER PUBLICATIONS

Dec. 22, 2015 Search Report issued in British Patent Application No. GB1512838.2.

(Continued)

*Primary Examiner* — Jason D Shanske
*Assistant Examiner* — Brian O Peters
(74) *Attorney, Agent, or Firm* — Oliff PLC

(57) ABSTRACT

A turbine stator vane assembly comprises a plurality of circumferentially arranged struts and a plurality of circumferentially arranged stator vanes. Each stator vane has a leading edge, a trailing edge and a chord length. Each strut has a leading edge, a trailing edge, a chord length, a pressure surface and a suction surface. The chord length of the struts is greater than the chord length of the stator vanes. The stator vanes are arranged in groups between adjacent pairs of struts and each group of stator vanes comprises a plurality of stator vanes. The circumferential spacing between adjacent struts is substantially the same and each stator vane in a group of stator vanes has a different chord length to the other stator vanes in that group of stator vanes.

22 Claims, 7 Drawing Sheets

(56) References Cited

U.S. PATENT DOCUMENTS

| | | | |
|---|---|---|---|
| 2013/0051996 A1* | 2/2013 | Hoeger | F01D 9/06 415/185 |
| 2013/0149135 A1* | 6/2013 | Hield | F01D 9/041 415/208.2 |
| 2013/0259672 A1 | 10/2013 | Suciu et al. | |
| 2013/0330180 A1 | 12/2013 | Guendogdu et al. | |
| 2015/0260103 A1* | 9/2015 | Yu | F01D 5/142 60/772 |
| 2016/0017732 A1* | 1/2016 | Thomas | F01D 5/141 60/805 |
| 2018/0252231 A1* | 9/2018 | Northall | F01D 9/041 |

FOREIGN PATENT DOCUMENTS

| | | |
|---|---|---|
| EP | 2 860 354 A1 | 4/2015 |
| GB | 2 226 600 A | 7/1990 |

OTHER PUBLICATIONS

Dec. 1, 2016 Search Report issued in European Patent Application No. 16177885.

* cited by examiner

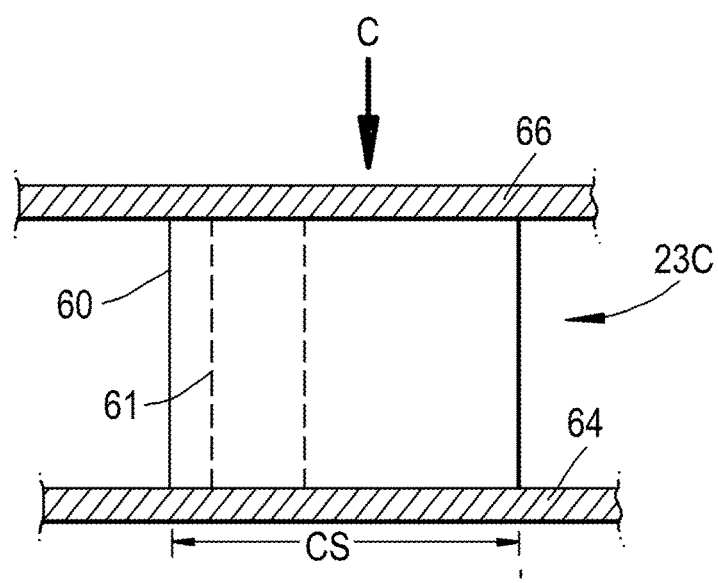
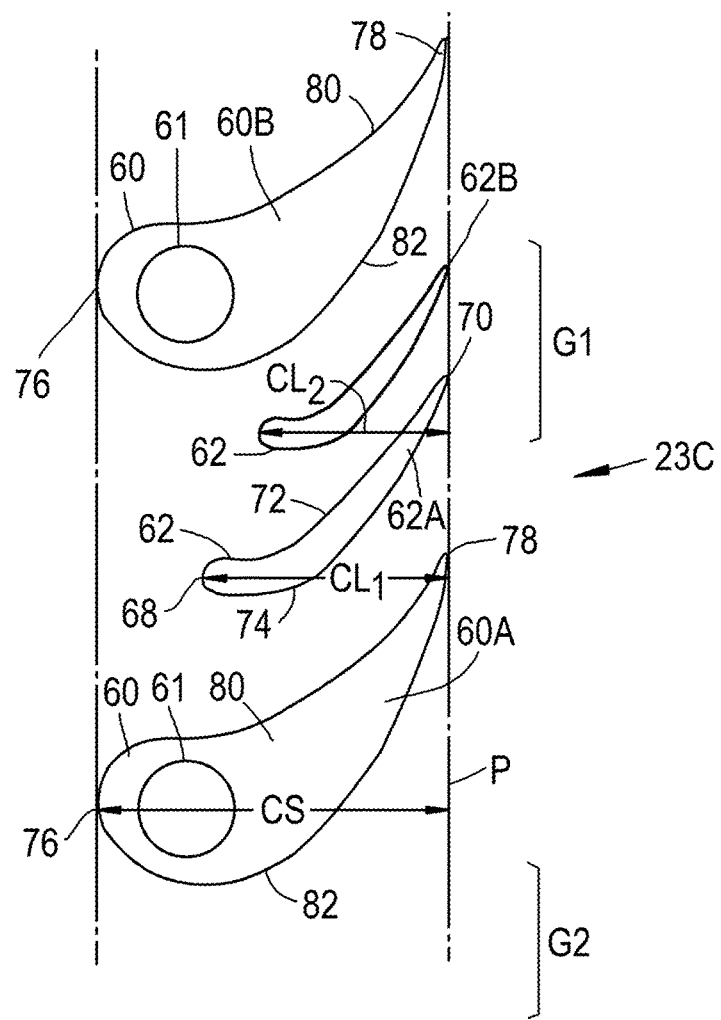

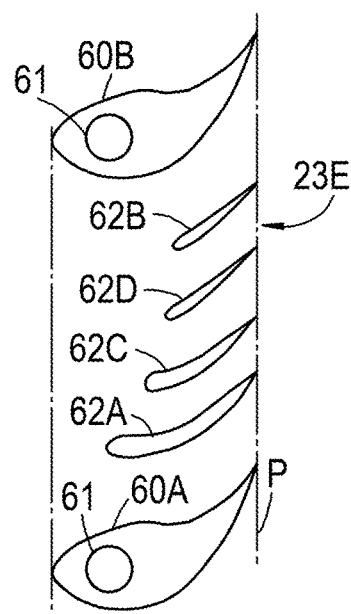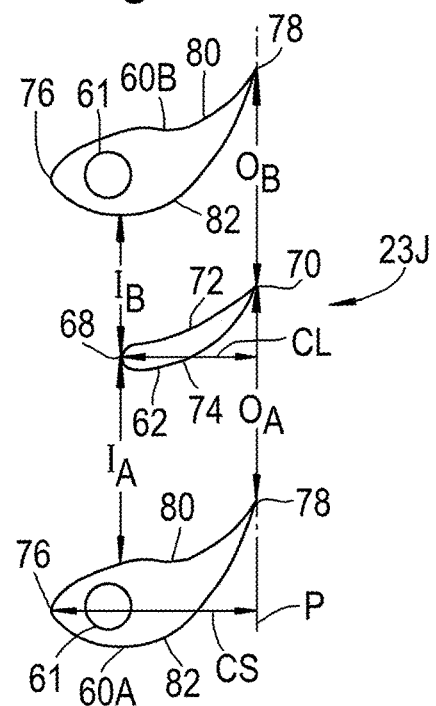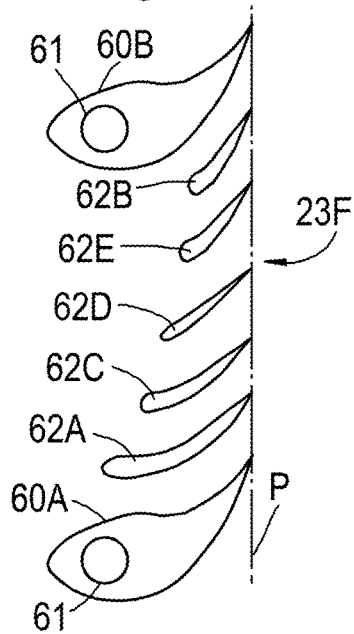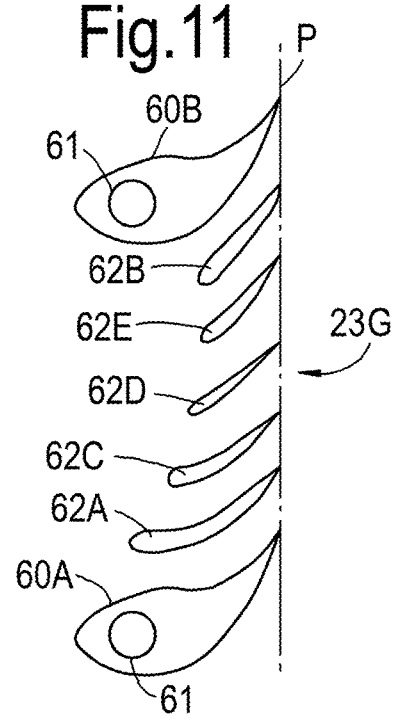

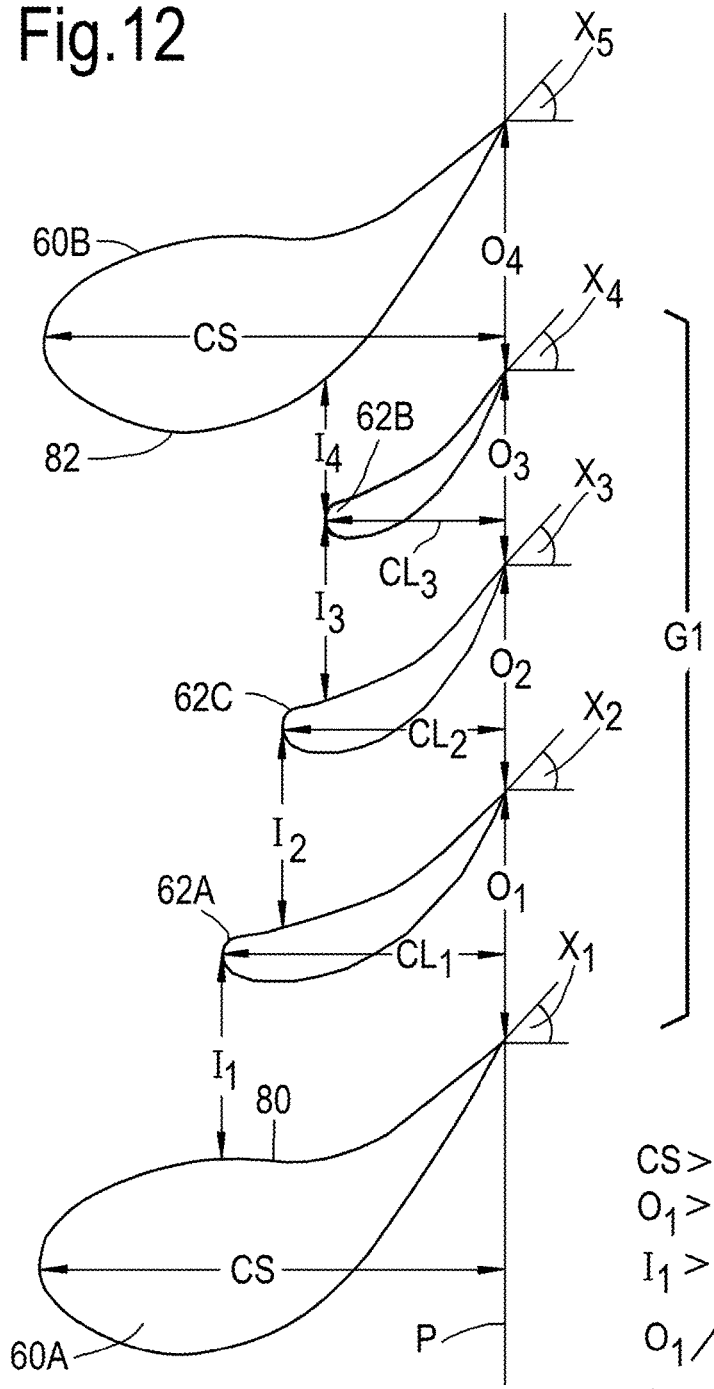

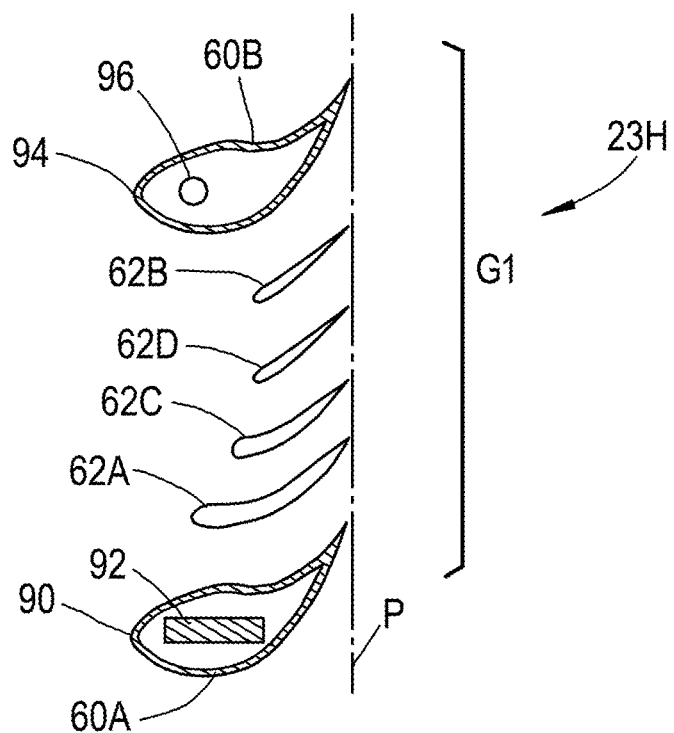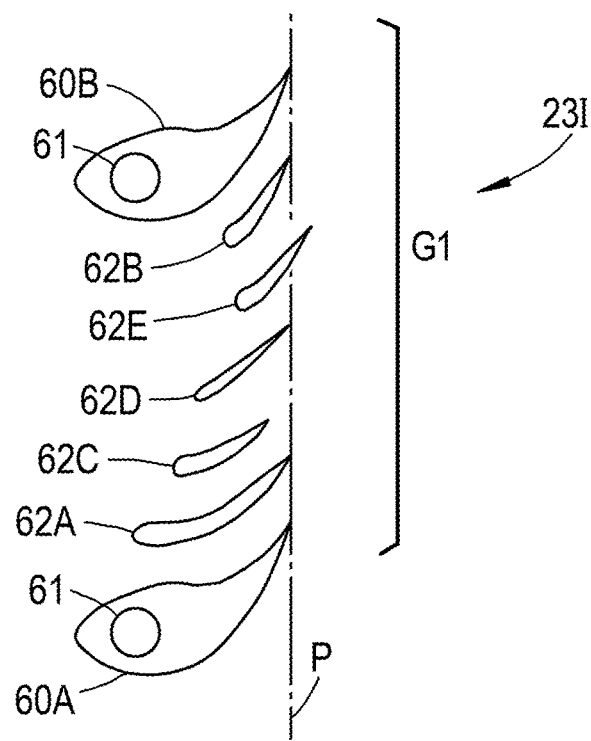

TURBINE STATOR VANE ASSEMBLY FOR A TURBOMACHINE

The present disclosure relates to a turbine stator vane assembly for a turbomachine and in particular to a turbine stator vane assembly for a gas turbine engine.

There is a requirement for services, e.g. lubricant, oil, coolant, air, electric cables etc., to be provided across the turbine flow path of a gas turbine engine. These services have been passed through fairings positioned axially upstream of a stage of turbine stator vanes, but this requires an increase in the axial length of the shafts etc. of the gas turbine engine, an increase in weight of the gas turbine engine and also an increase in aerodynamic losses due to the extra surface area.

In improved arrangements these services have been passed through the vanes of a stage of turbine stator vanes, this requires a decrease in the axial length of the shafts etc. of the gas turbine engine, a decrease in the weight of the gas turbine engine and an increase in the performance of the gas turbine engine compared to the arrangement in the previous paragraph. The vanes in the stage of turbine stator vanes have increased thickness in order for the services to be passed there-through and the stage of turbine stator vanes has a low number of vanes, a low aspect ratio and a high thickness to chord ratio. However, the stage of turbine stator vanes suffers from secondary flow losses, which reduces the performance of the stage of turbine stator vanes and the subsequent stage of turbine rotor blades.

Secondary flows reduce the aerodynamic efficiency of the turbine of the turbomachine or the gas turbine engine. Secondary flows are dependent upon the inlet boundary layer, the vane turning or vane loading, the vane aspect ratio, the vane surface pressure distribution and the number of vanes or the vane pitch to vane chord.

The inlet boundary layer is determined by the stages of blades and vanes upstream of the particular stator vane assembly of concern and hence modification of the inlet boundary layer is limited.

The vane turning may be modified but reducing the turning of the vane may result in a situation where the vane is not providing the optimum, or desired, amount of turning and may result in the vane providing no turning at all, e.g. the vane is simply a fairing and is not aerofoil, e.g. an aerodynamic component.

The vane aspect ratio is normally used by a designer as a controlled variable to balance the secondary flows, or secondary losses, and the profile losses. In the present situation where services are passed though the stator vane assembly this control is removed by the requirement to maintain an aerodynamic profile.

The vane pressure distribution is known to have a moderate effect on secondary flow strengths and that an aft-loaded profile reduces secondary flow strength.

The number of vanes and turning together describe the vane loading which is generally fixed, however the number of vanes alone or the pitch between vanes is more important as it prescribes the amount of inlet boundary layer associated with a vortex. As with the vane aspect ratio the designer has lost control of this variable due to the required increase in chord length and loading.

Thus, the provision of services has resulted in a loss of control of the vane count and aspect ratio of the stator vane assembly.

According to a first aspect of the disclosure there is provided a turbine stator vane assembly comprising a plurality of circumferentially arranged struts and a plurality of circumferentially arranged stator vanes, each stator vane having a leading edge, a trailing edge and a chord length, each strut having a leading edge, a trailing edge, a chord length, a pressure surface and a suction surface, the chord length of the struts being greater than the chord length of the stator vanes, the stator vanes being arranged in groups, each group of stator vanes being arranged between an adjacent pair of struts, each group of stator vanes comprising a plurality of stator vanes, wherein in at least one group of stator vanes the chord length of the stator vane nearest to the pressure surface of one of the adjacent struts is greater than the chord length of the stator vane nearest to the suction surface of the other of the adjacent struts.

In each group of stator vanes the chord length of the stator vane nearest to the pressure surface of one of the adjacent struts may be greater than the chord length of the stator vane nearest to the suction surface of the other of the adjacent struts.

The circumferential spacing between adjacent struts may be substantially the same.

The struts may have the same chord length.

In at least one group of stator vanes the chord length of the stator vanes may progressively decreases from the stator vane nearest to the pressure surface of one of the adjacent struts to the stator vane nearest to the suction surface of the other of the adjacent struts.

In each group of stator vanes the chord length of the stator vanes may progressively decreases from the stator vane nearest to the pressure surface of one of the adjacent struts to the stator vane nearest to the suction surface of the other of the adjacent struts.

Each stator vane in a group of stator vanes may have a different chord length to the other stator vanes in that group of stator vanes.

In at least one group of stator vanes the circumferential spacing between the trailing edges of the stator vanes may gradually decreases from the stator vane nearest to the pressure surface of one of the adjacent struts to the stator vane nearest to the suction surface of the other of the adjacent struts and the circumferential spacing between the trailing edge of the stator vane nearest to the pressure surface of one of the adjacent struts and the trailing edge of the one of the adjacent struts has a greater circumferential spacing.

In each group of stator vanes the circumferential spacing between the trailing edges of the stator vanes may gradually decreases from the stator vane nearest to the pressure surface of one of the adjacent struts to the stator vane nearest to the suction surface of the other of the adjacent struts and the circumferential spacing between the trailing edge of the stator vane nearest to the pressure surface of one of the adjacent struts and the trailing edge of the one of the adjacent struts has a greater circumferential spacing.

In each group of stator vanes the circumferential distance between the trailing edges of the stator vanes may gradually decreases from the stator vane nearest to the pressure surface of one of the adjacent struts to the stator vane nearest to the suction surface of the other of the adjacent struts and the circumferential distance between the trailing edge of the stator vane nearest to the pressure surface of one of the adjacent struts and the trailing edge of the one of the adjacent struts has a greater circumferential distance.

In each group of stator vanes the circumferential angle between the trailing edges of the stator vanes may gradually decreases from the stator vane nearest to the pressure surface of one of the adjacent struts to the stator vane nearest to the suction surface of the other of the adjacent struts and the circumferential angle between the trailing edge of the stator vane nearest to the pressure surface of one of the adjacent struts and the trailing edge of the one of the adjacent struts has a greater circumferential angle.

Each group of stator vanes may comprise two stator vanes.

Each group of stator vanes may comprise three stator vanes, each third stator vane is positioned circumferentially between the stator vane nearest to the pressure surface of one of the adjacent struts and the stator vane nearest to the suction surface of the other of the adjacent struts, each third stator vane has a chord length less than the chord length of the stator vane nearest to the pressure surface of the one of the adjacent struts and has a chord length greater than the chord length of the stator vane nearest to the suction surface of the other of the adjacent struts.

The circumferential spacing between the trailing edge of the third stator vane and the trailing edge of the stator vane nearest to the pressure surface of one of the adjacent struts may be greater than the circumferential spacing between the trailing edge of the third stator vane and the trailing edge of the stator vane nearest to the pressure surface of the other of the adjacent struts.

The circumferential distance between the trailing edge of the third stator vane and the trailing edge of the stator vane nearest to the pressure surface of one of the adjacent struts may be greater than the circumferential distance between the trailing edge of the third stator vane and the trailing edge of the stator vane nearest to the pressure surface of the other of the adjacent struts.

The circumferential angle between the trailing edge of the third stator vane and the trailing edge of the stator vane nearest to the pressure surface of one of the adjacent struts may be greater than the circumferential angle between the trailing edge of the third stator vane and the trailing edge of the stator vane nearest to the pressure surface of the other of the adjacent struts.

Each group of stator vanes may comprise four stator vanes, each third stator vane is positioned circumferentially between the stator vane nearest to the pressure surface of one of the adjacent struts and the stator vane nearest to the suction surface of the other of the adjacent struts, each third stator vane has a chord length less than the chord length of the stator vane nearest to the pressure surface of the one of the adjacent struts and has a chord length greater than the chord length of the stator vane nearest to the suction surface of the other of the adjacent struts, each fourth stator vane is positioned circumferentially between the third stator vane and the stator vane nearest to the suction surface of the other of the adjacent struts, each fourth stator vane has a chord length less than the chord length of the third stator vane and has a chord length greater than the chord length of the stator vane nearest to the suction surface of the other of the adjacent struts.

The circumferential spacing between the trailing edge of the third stator vane and the trailing edge of the stator vane nearest to the pressure surface of one of the adjacent struts may be greater than the circumferential spacing between the trailing edge of the third stator vane and the trailing edge of the fourth stator vane, the circumferential spacing between the trailing edge of the third stator vane and the trailing edge of the fourth stator vane is greater than the circumferential spacing between the trailing edge of the fourth stator vane and the trailing edge of the stator vane nearest to the pressure surface of one of the adjacent struts.

The circumferential distance between the trailing edge of the third stator vane and the trailing edge of the stator vane nearest to the pressure surface of one of the adjacent struts may be greater than the circumferential distance between the trailing edge of the third stator vane and the trailing edge of the fourth stator vane, the circumferential distance between the trailing edge of the third stator vane and the trailing edge of the fourth stator vane is greater than the circumferential distance between the trailing edge of the fourth stator vane and the trailing edge of the stator vane nearest to the pressure surface of one of the adjacent struts.

The circumferential angle between the trailing edge of the third stator vane and the trailing edge of the stator vane nearest to the pressure surface of one of the adjacent struts may be greater than the circumferential angle between the trailing edge of the third stator vane and the trailing edge of the fourth stator vane, the circumferential angle between the trailing edge of the third stator vane and the trailing edge of the fourth stator vane is greater than the circumferential angle between the trailing edge of the fourth stator vane and the trailing edge of the stator vane nearest to the pressure surface of one of the adjacent struts.

Each group of stator vanes may comprise five stator vanes, each third stator vane is positioned circumferentially between the stator vane nearest to the pressure surface of one of the adjacent struts and the stator vane nearest to the suction surface of the other of the adjacent struts, each third stator vane has a chord length less than the chord length of the stator vane nearest to the pressure surface of the one of the adjacent struts and has a chord length greater than the chord length of the stator vane nearest to the suction surface of the other of the adjacent struts, each fourth stator vane is positioned circumferentially between the third stator vane and the stator vane nearest to the suction surface of the other of the adjacent struts, each fourth stator vane has a chord length less than the chord length of the third stator vane and has a chord length greater than the chord length of the stator vane nearest to the suction surface of the other of the adjacent struts, each fifth stator vane is positioned circumferentially between the fourth stator vane and the stator vane nearest to the suction surface of the other of the adjacent struts, each fifth stator vane has a chord length less than the chord length of the fourth stator vane and has a chord length greater than the chord length of the stator vane nearest to the suction surface of the other of the adjacent struts.

The circumferential spacing between the trailing edge of the third stator vane and the trailing edge of the stator vane nearest to the pressure surface of one of the adjacent struts may be greater than the circumferential spacing between the trailing edge of the third stator vane and the trailing edge of the fourth stator vane, the circumferential spacing between the trailing edge of the third stator vane and the trailing edge of the fourth stator vane is greater than the circumferential spacing between the trailing edge of the fourth stator vane and the trailing edge of the fifth stator vane, the circumferential spacing between the trailing edge of the fourth stator vane and the trailing edge of the fifth stator vane is greater than the circumferential spacing between the trailing edge of the fifth stator vane and the stator vane nearest to the pressure surface of one of the adjacent struts.

The circumferential distance between the trailing edge of the third stator vane and the trailing edge of the stator vane nearest to the pressure surface of one of the adjacent struts may be greater than the circumferential distance between the trailing edge of the third stator vane and the trailing edge of the fourth stator vane, the circumferential distance between the trailing edge of the third stator vane and the trailing edge of the fourth stator vane is greater than the circumferential distance between the trailing edge of the fourth stator vane and the trailing edge of the fifth stator vane, the circumferential distance between the trailing edge of the fourth stator vane and the trailing edge of the fifth stator vane is greater than the circumferential distance between the trailing edge of the fifth stator vane and the stator vane nearest to the pressure surface of one of the adjacent struts.

The circumferential angle between the trailing edge of the third stator vane and the trailing edge of the stator vane nearest to the pressure surface of one of the adjacent struts may be greater than the circumferential angle between the trailing edge of the third stator vane and the trailing edge of the fourth stator vane, the circumferential angle between the trailing edge of the third stator vane and the trailing edge of the fourth stator vane is greater than the circumferential angle between the trailing edge of the fourth stator vane and the trailing edge of the fifth stator vane, the circumferential angle between the trailing edge of the fourth stator vane and the trailing edge of the fifth stator vane is greater than the circumferential angle between the trailing edge of the fifth stator vane and the stator vane nearest to the pressure surface of one of the adjacent struts.

In at least one group of stator vanes the ratio of the circumferential distance between the trailing edge of the stator vane nearest the pressure surface of one of the adjacent struts to the trailing edge of one of the adjacent struts to the circumferential distance between the leading edge of the stator vane nearest the pressure surface of one of the adjacent struts to the pressure surface of one of the adjacent struts may be less than the ratio of the circumferential distance between the trailing edge of the stator vane nearest the suction surface of the other of the adjacent struts to the trailing edge of the other of the adjacent struts to the circumferential distance between the leading edge of the stator vane nearest the suction surface of the other of the adjacent struts to the suction surface of the other of the adjacent struts.

In each group of stator vanes the ratio of the circumferential distance between the trailing edge of the stator vane nearest the pressure surface of one of the adjacent struts to the trailing edge of one of the adjacent struts to the circumferential distance between the leading edge of the stator vane nearest the pressure surface of one of the adjacent struts to the pressure surface of one of the adjacent struts may be less than the ratio of the circumferential distance between the trailing edge of the stator vane nearest the suction surface of the other of the adjacent struts to the trailing edge of the other of the adjacent struts to the circumferential distance between the leading edge of the stator vane nearest the suction surface of the other of the adjacent struts to the suction surface of the other of the adjacent struts.

The trailing edges of the stator vanes and the trailing edges of the struts may be arranged in a common plane arranged perpendicular to the axis of the stator vane assembly.

The stator vanes have an exit angle at their trailing edges, the struts have an exit angle at their trailing edges and the stator vanes and the struts may have the same exit angle.

The stator vane assembly may be a turbomachine stator vane assembly.

The stator vane assembly may be a gas turbine stator vane assembly.

According to another aspect of the disclosure there is provided a turbine stator vane assembly comprising a plurality of circumferentially arranged struts and a plurality of circumferentially arranged stator vanes, each stator vane having a leading edge, a trailing edge and a chord length, each strut having a leading edge, a trailing edge, a chord length, a pressure surface and a suction surface, the chord length of the struts being greater than the chord length of the stator vanes, the stator vanes being arranged in groups, each group of stator vanes being arranged between an adjacent pair of struts, each group of stator vanes comprising a plurality of stator vanes, and each stator vane in at least one group of stator vanes has a different chord length to the other stator vanes in that group of stator vanes.

Each stator vane in each group of stator vanes may have a different chord length to the other stator vanes in that group of stator vanes.

According to a further aspect of the disclosure there is provided a turbine stator vane assembly comprising a plurality of circumferentially arranged struts and a plurality of circumferentially arranged stator vanes, each stator vane having a leading edge, a trailing edge and a chord length, each strut having a leading edge, a trailing edge, a chord length, a pressure surface and a suction surface, the chord length of the struts being greater than the chord length of the stator vanes, the stator vanes being arranged in groups, each group of stator vanes being arranged between an adjacent pair of struts, each group of stator vanes comprising a plurality of stator vanes, in at least one group of stator vanes the circumferential spacing between the trailing edges of the stator vanes gradually decreases from the stator vane nearest to the pressure surface of one of the adjacent struts to the stator vane nearest to the suction surface of the other of the adjacent struts and the circumferential spacing between the trailing edge of the stator vane nearest to the pressure surface of one of the adjacent struts and the trailing edge of the one of the adjacent struts has a greater circumferential spacing.

In each group of stator vanes the circumferential spacing between the trailing edges of the stator vanes gradually decreases from the stator vane nearest to the pressure surface of one of the adjacent struts to the stator vane nearest to the suction surface of the other of the adjacent struts and the circumferential spacing between the trailing edge of the stator vane nearest to the pressure surface of one of the adjacent struts and the trailing edge of the one of the adjacent struts has a greater circumferential spacing.

According to an additional aspect of the disclosure there is provided a turbine stator vane assembly comprising a plurality of circumferentially arranged struts and a plurality of circumferentially arranged stator vanes, each stator vane having a leading edge, a trailing edge and a chord length, each strut having a leading edge, a trailing edge, a chord length, a pressure surface and a suction surface, the chord length of the struts being greater than the chord length of the stator vanes, the stator vanes being arranged in groups, each group of stator vanes being arranged between an adjacent pair of struts, each group of stator vanes comprising a plurality of stator vanes, in at least one group of stator vanes the ratio of the circumferential distance between the trailing edge of the stator vane nearest the pressure surface of one of the adjacent struts to the trailing edge of one of the adjacent struts to the circumferential distance between the leading edge of the stator vane nearest the pressure surface of one of the adjacent struts to the pressure surface of one of the adjacent struts is less than the ratio of the circumferential distance between the trailing edge of the stator vane nearest the suction surface of the other of the adjacent struts to the trailing edge of the other of the adjacent struts to the circumferential distance between the leading edge of the stator vane nearest the suction surface of the other of the adjacent struts to the suction surface of the other of the adjacent struts.

In each of group of stator vanes the ratio of the circumferential distance between the trailing edge of the stator vane nearest the pressure surface of one of the adjacent struts to the trailing edge of one of the adjacent struts to the circumferential distance between the leading edge of the stator vane nearest the pressure surface of one of the adjacent struts may be less than the ratio of the circumferential distance between the trailing edge of the stator vane nearest the suction surface of the other of the adjacent struts to the trailing edge of the other of the adjacent struts to the circumferential distance between the leading edge of the stator vane nearest the suction surface of the other of the adjacent struts to the suction surface of the other of the adjacent struts.

The skilled person will appreciate that except where mutually exclusive, a feature described in relation to any one of the above aspects of the invention may be applied mutatis mutandis to any other aspect of the invention.

Embodiments of the disclosure will now be described by way of example only, with reference to the Figures, in which:

FIG. 6 is an enlarged view of one embodiment of a stator vane assembly according to the present disclosure.

FIG. 7 is an enlarged view in the direction of arrow C in FIG. 6.

FIG. 9 is an enlarged additional view in the direction of arrow C in FIG. 6.

FIG. 10 is an enlarged further view in the direction of arrow C in FIG. 6.

FIG. 11 is an enlarged further view in the direction of arrow C in FIG. 6.

FIG. 12 is a schematic view in the direction of arrow C in FIG. 6 showing the relationship between various parameters of the vanes and struts in group of vanes.

FIG. 13 is an enlarged additional view in the direction of arrow C in FIG. 6.

FIG. 14 is an enlarged additional view in the direction of arrow C in FIG. 6.

FIG. 15 is an enlarged additional view in the direction of arrow C in FIG. 6.

Figure 1:
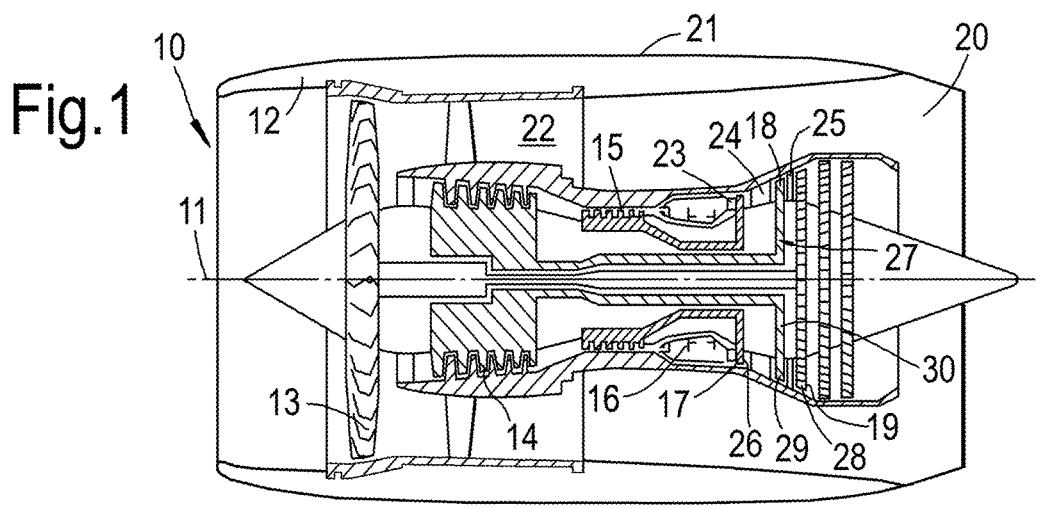
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

The high, intermediate and low pressure turbines 17, 18 and 19 each comprise a turbine stator vane assembly 23, 24 and 25 positioned upstream of a turbine rotor blade assembly 26, 27 and 28 respectively. The turbine rotor blade assemblies 26, 27 and 28 each comprises a stage of circumferentially arranged and radially outwardly extending turbine rotor blades 29 mounted on a turbine rotor, or turbine disc, 30 as shown for intermediate pressure turbine 18.

Figure 2:
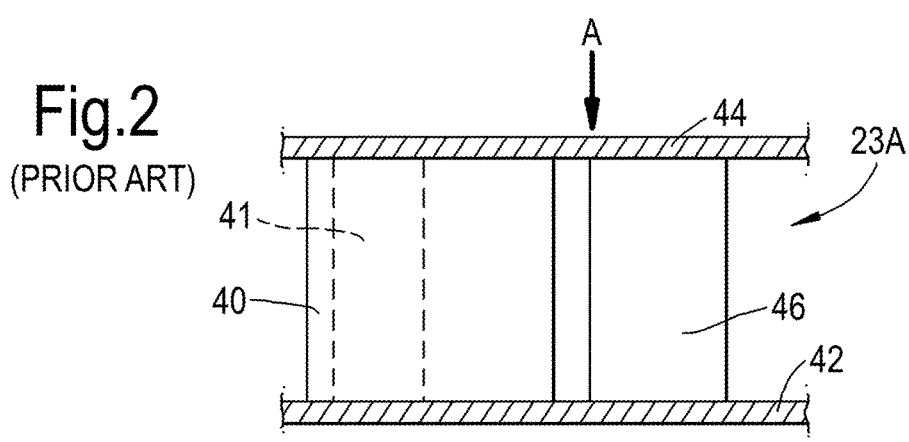
FIG. 2 is an enlarged view of a prior art stator vane assembly.
Figure 3:
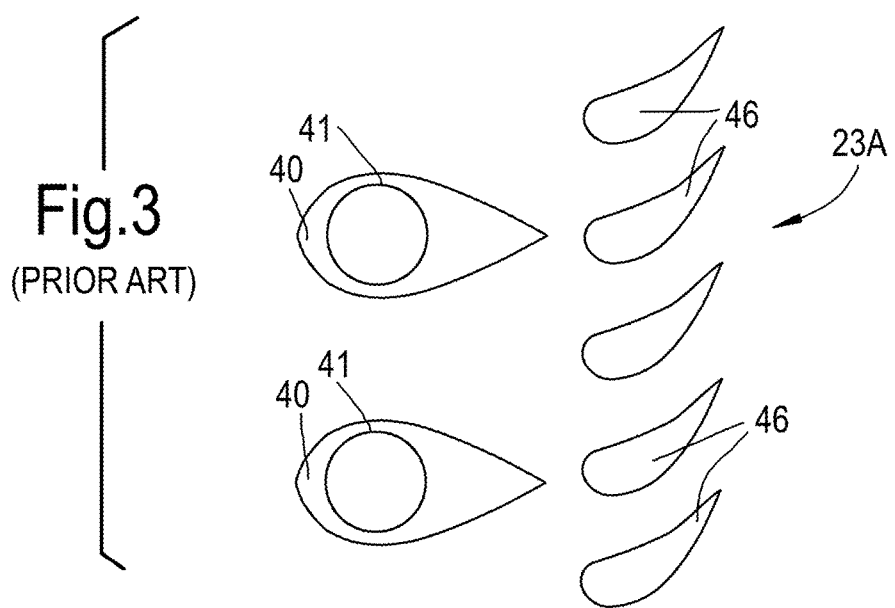
FIG. 3 is an enlarged view in the direction of arrow A in FIG. 2.

A turbine stator vane assembly 23A according to the first piece of prior art discussed at page 1 is shown in FIGS. 2 and 3 and comprises a plurality of circumferentially arranged and radially extending fairings, or struts, 40 mounted on radially inner and outer platforms 42 and 44 and a plurality of circumferentially arranged and radially extending turbine stator vanes 46 mounted on the radially inner and outer platforms 42 and 44. The fairings, or struts, 40 are located axially upstream of the turbine stator vanes 46. One or more of the fairings, or struts, 40 have services 41 extending there-through. Each fairing, or strut, 40 is generally symmetrical about a respective plane containing the axis 11 of the gas turbine engine 10 whereas the turbine stator vanes 46 are aerofoil in shape.

Figure 4:
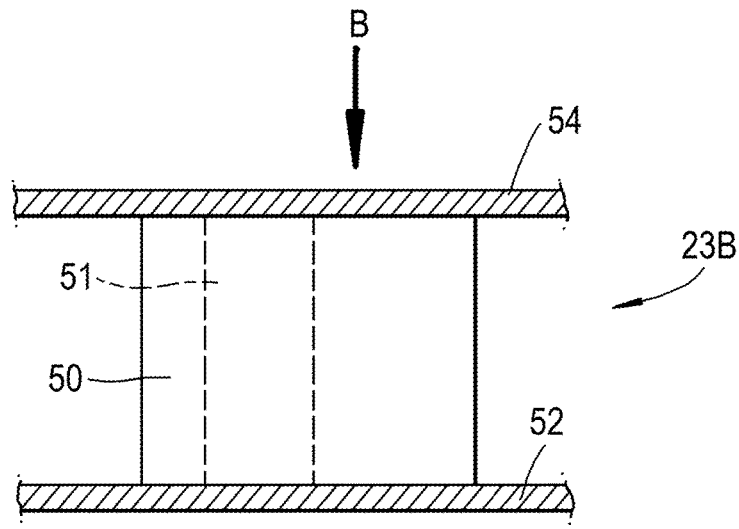
FIG. 4 is an enlarged view of a further prior art stator vane assembly.
Figure 5:
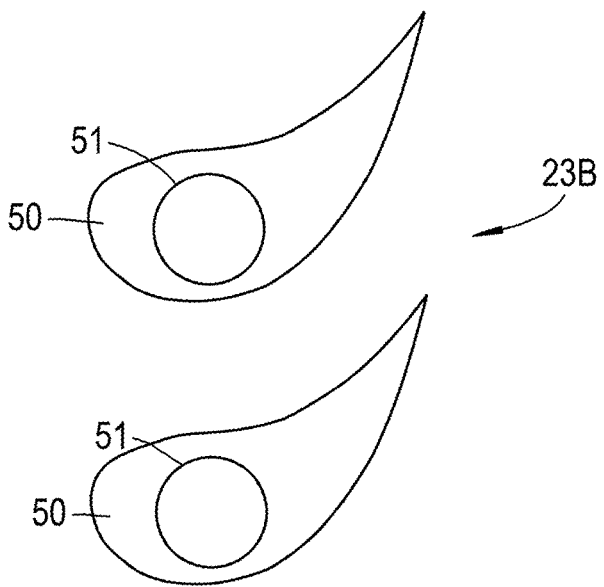
FIG. 5 is an enlarged view in the direction of arrow B in FIG. 4.

A turbine stator vane assembly 23B according to the second piece of prior art discussed at page 1 is shown in FIGS. 4 and 5 and comprises a plurality of circumferentially arranged and radially extending turbine stator vanes 50 mounted on radially inner and outer platforms 52 and 54. One or more of the turbine stator vanes 50 have services 51 extending there-through and the turbine stator vanes 50 are aerofoil in shape.

A turbine stator vane assembly 23C according to the present disclosure is shown in FIGS. 6 and 7 and comprises a plurality of radially extending and circumferentially arranged struts 60 and a plurality of radially extending and circumferentially arranged stator vanes 62 mounted on radially inner and outer platforms 64 and 66. The struts 60 and the stator vanes 62 are aerofoil in shape. Each stator vane 62 has a leading edge 68, a trailing edge 70, an axial chord length CL, a pressure surface 72 and a suction surface 74 and each strut 60 has a leading edge 76, a trailing edge 78, an axial chord length CS, a pressure surface 80 and a suction surface 82. The pressure surface 72 of each stator vane 62 extends from the leading edge 68 to the trailing edge 70 and the suction surface 74 extends from the leading edge 68 to the trailing edge 70. The pressure surface 80 of each strut 60 extends from the leading edge 76 to the trailing edge 78 and the suction surface 82 extends from the leading edge 76 to the trailing edge 78. The axial chord length CS of the struts 60 is greater than the axial chord length CL of the stator vanes 62 and the stator vanes 62 are arranged in groups G1, G2. Each group of stator vanes G1, G2 is positioned between an adjacent pair of struts 60, e.g. each group of stator vanes G1, G2 is positioned between a respective pair of adjacent struts 60. Each group of stator vanes G1, G2 comprises a plurality of stator vanes 62 and the circumferential spacing between adjacent struts 60 is substantially the same and each stator vane 62 in a group of stator vanes G1, G2 has a different axial chord length CL to the other stator vanes 62 in that group of stator vanes G1, G2 respectively. It is to be noted that the struts 60 have the same axial chord length CS. One or more of the struts 60 have services 61 extending there-through and it is to be noted that both the struts 60 and the stator vanes 62 are aerofoil in shape. The services 61 may be a pipe for the supply of lubricant, e.g. oil, a duct for a supply of coolant, e.g. air, or an electric cables etc.

In at least one, and preferably, each group G1, G2 of stator vanes 62 the axial chord length $CL_1$ of the stator vane 62A nearest to the pressure surface 80 of one of the adjacent struts 60A is greater than the axial chord length $CL_2$ of the stator vane 62B nearest to the suction surface 82 of the other of the adjacent struts 60B. In each group G1, G2 of stator vanes 62 the axial chord length CL of the stator vanes 62 progressively decreases from the stator vane 62A nearest to the pressure surface 80 of one of the adjacent struts 60A to the stator vane 62B nearest to the suction surface 82 of the other of the adjacent struts 60B.

It is to be noticed the struts 60 have the same actual chord length and each stator vane 62 in a group of stator vanes G1, G2 has a different actual chord length to the other stator vanes 62 in that group of stator vanes G1, G2 respectively. It is to be noted that stator vane 62A has a greater actual chord length than stator vane 62B and the struts 60 have a greater actual chord length than the stator vanes 62A and 62B.

In at least one, and preferably, each group G1, G2 of stator vanes 62 the circumferential spacing, e.g. the circumferential distance or circumferential angle, between the trailing edges 70 of the stator vanes 62 gradually decreases from the stator vane 62A nearest to the pressure surface 80 of one of the adjacent struts 60A to the stator vane 62B nearest to the suction surface 82 of the other of the adjacent struts 60B and the circumferential spacing, e.g. the circumferential distance or circumferential angle, between the trailing edge 70 of the stator vane 62A nearest to the pressure surface 80 of one of the adjacent struts 60A and the trailing edge 70 of the one of the adjacent struts 62B has a greater circumferential spacing, e.g. circumferential distance or circumferential angle.

As shown in FIG. 7, each group G1, G2 of stator vanes 62 comprises two stator vanes 62A and 62B.

Figure 8:
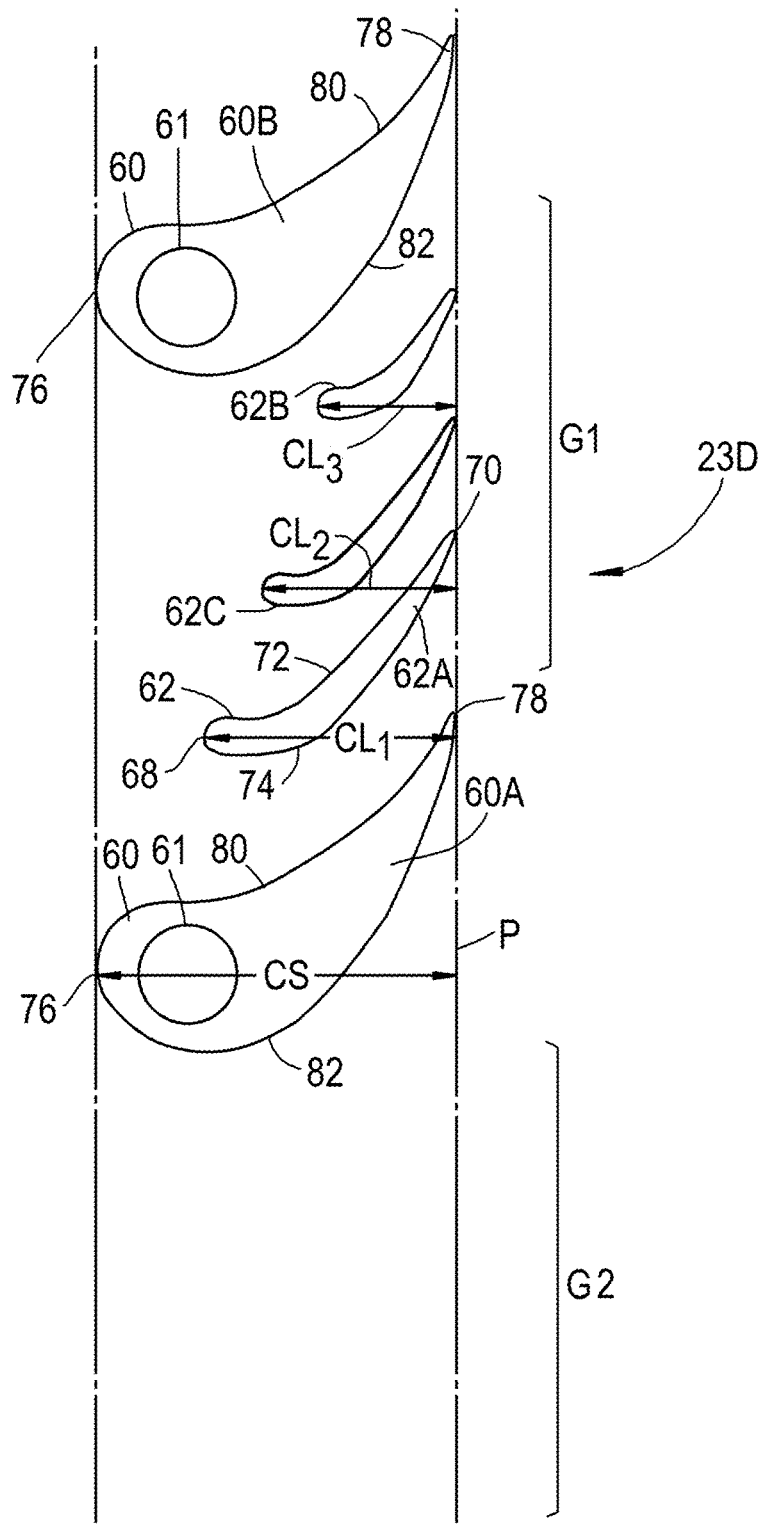
FIG. 8 is an enlarged alternative view in the direction of arrow C in FIG. 6.

An alternative turbine stator vane assembly 23D according to the present disclosure is shown in FIGS. 6 and 8. This turbine stator vane assembly 23D is similar to the turbine stator vane assembly 23C but in FIG. 8 each group of stator vanes G1, G2 comprises three stator vanes 62. Each third stator vane 62C is positioned circumferentially between the stator vane 62A nearest to the pressure surface 80 of one of the adjacent struts 60A and the stator vane 62B nearest to the suction surface 82 of the other of the adjacent struts 60B. Each third stator vane 62C has an axial chord length $CL_2$ less than the axial chord length $CL_1$ of the stator vane 62A nearest to the pressure surface 80 of the one of the adjacent struts 60A and has an axial chord length $CL_2$ greater than the axial chord length $CL_3$ of the stator vane 62B nearest to the suction surface 82 of the other of the adjacent struts 60B.

It is to be noticed the struts 60 have the same actual chord length and each stator vane 62 in a group of stator vanes G1, G2 has a different actual chord length to the other stator vanes 62 in that group of stator vanes G1, G2 respectively. It is to be noted that stator vane 62A has a greater actual chord length than stator vane 62C, that stator vane 62C has a greater actual chord length then stator vane 62B and the struts 60 have a greater actual chord length than the stator vanes 62A and 62B.

The circumferential spacing, e.g. the circumferential distance or the circumferential angle, between the trailing edge 70 of the third stator vane 62C and the trailing edge 70 of the stator vane 62A nearest to the pressure surface 80 of one of the adjacent struts 60A is greater than the circumferential spacing, e.g. circumferential distance or circumferential angle, between the trailing edge 70 of the third stator vane 62C and the trailing edge 70 of the stator vane 62B nearest to the pressure surface 80 of the other of the adjacent struts 60B.

An additional turbine stator vane assembly 23E according to the present disclosure is shown in FIGS. 6 and 9. This turbine stator vane assembly 23E is similar to the turbine stator vane assembly 23C but in FIG. 9 each group of stator vanes G1, G2 comprises four stator vanes 62. Each third stator vane 62C is positioned circumferentially between the stator vane 62A nearest to the pressure surface 80 of one of the adjacent struts 60A and the stator vane 62B nearest to the suction surface 82 of the other of the adjacent struts 60B. Each third stator vane 62C has an axial chord length less than the axial chord length of the stator vane 62A nearest to the pressure surface 80 of the one of the adjacent struts 60A and has an axial chord length greater than the axial chord length of the stator vane 62B nearest to the suction surface 82 of the other of the adjacent struts 60B. Each fourth stator vane 62D is positioned circumferentially between the third stator vane 62C and the stator vane 62B nearest to the suction surface 82 of the other of the adjacent struts 60. Each fourth stator vane 62D has an axial chord length less than the axial chord length of the third stator vane 62C and has an axial chord length greater than the axial chord length of the stator vane 62B nearest to the suction surface 82 of the other of the adjacent struts 60B.

It is to be noticed the struts 60 have the same actual chord length and each stator vane 62 in a group of stator vanes G1, G2 has a different actual chord length to the other stator vanes 62 in that group of stator vanes G1, G2 respectively. It is to be noted that stator vane 62A has a greater actual chord length than stator vane 62C, that stator vane 62C has a greater actual chord length then stator vane 62D, that stator vane 62D has a greater actual chord length then stator vane 62B and the struts 60 have a greater actual chord length than the stator vanes 62A and 62B.

The circumferential spacing, e.g. the circumferential distance or the circumferential angle, between the trailing edge 70 of the third stator vane 62C and the trailing edge 70 of the stator vane 62A nearest to the pressure surface 80 of one of the adjacent struts 60A is greater than the circumferential spacing between the trailing edge 70 of the third stator vane 62C and the trailing edge 70 of the fourth stator vane 62D. The circumferential spacing, the circumferential distance or the circumferential angle, between the trailing edge 70 of the third stator vane 62C and the trailing edge 70 of the fourth stator vane 62D is greater than the circumferential spacing, the circumferential distance or the circumferential angle, between the trailing edge 70 of the fourth stator vane 62D and the trailing edge 70 of the stator vane 62B nearest to the suction surface 82 of one of the adjacent struts 60B.

A further turbine stator vane assembly 23F according to the present disclosure is shown in FIGS. 6 and 10. This turbine stator vane assembly 23F is similar to the turbine stator vane assembly 23C but in FIG. 10 each group of stator vanes G1, G2 comprises five stator vanes 62. Each third stator vane 62C is positioned circumferentially between the stator vane 62A nearest to the pressure surface 80 of one of the adjacent struts 60A and the stator vane 62B nearest to the suction surface 82 of the other of the adjacent struts 60B. Each third stator vane 62C has an axial chord length less than the axial chord length of the stator vane 62A nearest to the pressure surface 80 of the one of the adjacent struts 60A and has an axial chord length greater than the axial chord length of the stator vane 62B nearest to the suction surface 82 of the other of the adjacent struts 60B. Each fourth stator vane 62D is positioned circumferentially between the third stator vane 62C and the stator vane 62B nearest to the suction surface 82 of the other of the adjacent struts 60B. Each fourth stator vane 62D has an axial chord length less than the axial chord length of the third stator vane 62C and has an axial chord length greater than the axial chord length of the stator vane 62A nearest to the suction surface 82 of the other of the adjacent struts 60B. Each fifth stator vane 62E is positioned circumferentially between the fourth stator vane 62D and the stator vane 62B nearest to the suction surface 82 of the other of the adjacent struts 60B. Each fifth stator vane 62E has an axial chord length less than the axial chord length of the fourth stator vane 62D and has an axial chord length greater than the axial chord length of the stator vane 62B nearest to the suction surface 82 of the other of the adjacent struts 60B.

It is to be noticed the struts 60 have the same actual chord length and each stator vane 62 in a group of stator vanes G1, G2 has a different actual chord length to the other stator vanes 62 in that group of stator vanes G1, G2 respectively. It is to be noted that stator vane 62A has a greater actual chord length than stator vane 62C, that stator vane 62C has a greater actual chord length then stator vane 62D, that stator vane 62D has a greater actual chord length then stator vane 62E, that stator vane 62E has a greater actual chord length then stator vane 62B and the struts 60 have a greater actual chord length than the stator vanes 62A and 62B.

The circumferential spacing, e.g. the circumferential distance or circumferential angle, between the trailing edge 70 of the third stator vane 62C and the trailing edge 70 of the stator vane 62A nearest to the pressure surface 80 of one of the adjacent struts 60A is greater than the circumferential spacing between the trailing edge 70 of the third stator vane 62C and the trailing edge 70 of the fourth stator vane 62D. The circumferential spacing between the trailing edge 70 of the third stator vane 62C and the trailing edge 70 of the fourth stator vane 62D is greater than the circumferential spacing between the trailing edge 70 of the fourth stator vane 62D and the trailing edge 70 of the fifth stator vane 62E. The circumferential spacing between the trailing edge 70 of the fourth stator vane 62D and the trailing edge 70 of the fifth stator vane 62E is greater than the circumferential spacing between the trailing edge 70 of the fifth stator vane 62E and the stator vane 62B nearest to the suction surface of one of the adjacent struts 60B.

In each of the turbine stator vane assemblies described above at least one, and preferably each, group G1, G2 of stator vanes 62 the ratio of the circumferential spacing, e.g. circumferential distance or circumferential angle, $O_1$ between the trailing edge 70 of the stator vane 62A nearest the pressure surface 80 of one of the adjacent struts 60A to the trailing edge 78 of one of the adjacent struts 60A to the circumferential spacing, e.g. circumferential distance or circumferential angle, $I_1$ between the leading edge 68 of the stator vane 62A nearest the pressure surface 80 of one of the adjacent struts 60A to the pressure surface 80 of one of the adjacent struts 60A is less than the ratio of the circumferential spacing, e.g. circumferential distance or circumferential angle, $O_4$ between the trailing edge 70 of the stator vane 62B nearest the suction surface 82 of the other of the adjacent struts 60B to the trailing edge 78 of the other of the adjacent struts 60B to the circumferential spacing, e.g. circumferential distance or circumferential angle, $I_4$ between the leading edge 68 of the stator vane 62B nearest the suction surface 82 of the other of the adjacent struts 80B to the suction surface 82 of the other of the adjacent struts 60B.

In each of the turbine stator vane assemblies described above the trailing edges 70 of the stator vanes 62 and the trailing edges 78 of the struts 60 are arranged in a common plane P arranged perpendicular to the axis of the turbine stator vane assembly. In each of the turbine stator vane assemblies described above the stator vanes 62 are arranged at the downstream ends of the passages defined between the adjacent struts 60.

In some circumstances, in which there are a large number of stator vanes provided between adjacent pairs of struts, it may not be necessary for the axial chordal length of the stator vanes nearer to the strut with the suction surface to reduce in length and in these cases the axial chordal length may be maintained constant. In these circumstances the stator vane reaches the optimum vane aspect ratio and further reduction in the axial chordal length of the stator vanes is not beneficial as is shown in FIG. 11. The further turbine stator vane assembly 23G according to the present disclosure is shown in FIGS. 6 and 11. The turbine stator vane assembly 23G is similar to the turbine stator vane assembly 23F but in FIG. 11 each third stator vane 62C has an axial chord length less than the axial chord length of the stator vane 62A nearest to the pressure surface 80 of the one of the adjacent struts 60A and has an axial chord length greater than the axial chord length of the stator vane 62B nearest to the suction surface 82 of the other of the adjacent struts 60B. Each fourth stator vane 62D has an axial chord length less than the axial chord length of the third stator vane 62C and has an axial chord length equal to the axial chord length of the stator vane 62A nearest to the suction surface 82 of the other of the adjacent struts 60B. Each fifth stator vane 62E has an axial chord length equal to the axial chord length of the fourth stator vane 62D and has an axial chord length equal to the axial chord length of the stator vane 62B nearest to the suction surface 82 of the other of the adjacent struts 60B.

It is to be noticed the struts 60 have the same actual chord length and each stator vane 62 in a group of stator vanes G1, G2 has a different actual chord length to the other stator vanes 62 in that group of stator vanes G1, G2 respectively. It is to be noted that stator vane 62A has a greater actual chord length than stator vane 62C, that stator vane 62C has a greater actual chord length then stator vane 62D, that stator vane 62D has a greater actual chord length then stator vane 62E, that stator vane 62E has the same actual chord length as stator vane 62B and the struts 60 have a greater actual chord length than the stator vanes 62A and 62B.

The leading edge positions of the vanes are set to ensure that the correct mass flow enters each passage. In general the flow is quicker on the suction surface of the strut than the pressure surface of the strut and hence a larger catchment, inlet, is required in the passage close to the pressure surface of the strut than the passage close to the suction surface of the strut.

FIG. 12 shows the parameters of the struts and vanes of a turbine stator assembly with three vanes between adjacent vanes. These relationships are also provided here, where CS is the axial chord length of the struts, CL is the axial chord length of the vanes, O is the outlet circumferential spacing, I is the inlet circumferential spacing, X is the exit angle:—

$CS > CL_1 > CL_2 > CL_3$     1.

$O_1 > O_2 > O_3$     2.

$I_1 > I_2 > I_3 > I_4$     3.

$O_1/I_1 = \min$     4.

$O_4/I_4 = \max$     5.

$X_1 = X_2 = X_3 = X_4 = X_5$     6.

$O_4/I_4 > O_1/I_1$     7.

An alternative equation 1 for large numbers of vanes is $CS>CL_1>CL_2>CL_3=CL_4=CL_5$ or $CS>CL_1>CL_2>CL_3=CL_4$ or $CS>CL_1>CL_2>CL_3>CL_4=CL_5$ The present disclosure arranges the stator vanes at the downstream end of the passages between the struts to reduce the secondary flows or secondary losses. The trailing edges of the stator vanes and struts may be aligned in a common plane to reduce secondary flows or secondary losses resulting from secondary flow features due to varied axial positions of the trailing edges of the stator vanes and struts. In addition providing the trailing edges in a common plane minimises the axial length of the turbine stator vane assembly and the turbomachine. The provision of the stator vanes with reducing chord length, or axial chord length, ensures that the boundary layer is partitioned equally to each of the passages and in particular ensures that each stator vane catches the secondary flow or secondary flows from the previous stator vane or strut. If a stator vane is too short in chord length then the secondary flow or secondary flows or horseshoe vortex will pass upstream of its leading edge into the next passage.

Although the present disclosure has referred to the struts being provided to carry services, e.g. lubricant, oil, coolant, air, electric cables etc., it is equally applicable to turbine stator vane assemblies in which the struts are provided for other purposes, e.g. to act as a structural support or to enclose a structural member.

Although the present disclosure has referred to the struts having the same chord length it is equally possible for the struts to have different chord lengths, in each of the embodiments described above. The struts may have different chord lengths, and also different thicknesses, due to the requirement for different struts to carry different services or to act as a structural support. For example the struts located at the top of a stator vane assembly of a gas turbine engine, particularly an aero gas turbine engine, may be generally larger than the other struts because they act as structural support or accommodate structural members, so that the structural support is nearer to an aircraft mounting point and an aircraft pylon, whilst the struts at the bottom of the stator vane assembly of the gas turbine engine may be generally smaller because they only accommodate lubricant, e.g. lubricant, oil, pipes, coolant, e.g. air, pipes or electric cables etc.

A further turbine stator vane assembly 23H according to the present disclosure is shown in FIGS. 6 and 13. The arrangement is similar to the stator vane assembly shown in FIG. 9 but differs in that the struts 60A and 60B have different chord lengths. The strut 60A comprises an aerofoil shaped fairing 90 which surrounds a radially extending structural support 92 whereas the strut 60B comprises an aerofoil shaped fairing 94 which surrounds a service, e.g. a lubricant, oil, pipe, a coolant, air, pipe or an electric cable etc. 96. The axial chord length of the strut 60A is greater than the axial chord length of the strut 60B. The trailing edges of the struts 60A, 60B and the stator vanes 62 are arranged in a common plane P.

Although the present disclosure has referred to the trailing edges of the struts and vanes being aligned in a common plane arranged perpendicular to the axis of the turbine stator vane assembly it is equally possible for the trailing edges of the struts and vanes to be close to alignment in a common plane arranged perpendicular to the axis of the turbine stator vane assembly, e.g. within +/−10% of the axial chord of the struts in each of the embodiments described above so that the secondary flows or secondary losses resulting from secondary flow features due to varied axial positions of the trailing edges of the vanes and struts are not too large.

A further turbine stator vane assembly 23I according to the present disclosure is shown in FIGS. 6 and 14. The arrangement is similar to the stator vane assembly shown in FIG. 10 but differs in that the trailing edges of the struts 60A, 60B and the stator vanes 62 are not arranged in a common plane P. The strut 60A and stator vanes 62A, 62D and 62B have their trailing edges in a common plane P whereas the stator vane 62C has its trailing edge upstream of the plane P within 10% of the axial chord of the strut 60A. The stator vane 62E has its trailing edge downstream of the plane P within 10% of the axial chord of the strut 60A. The strut 60B has its trailing edge downstream of the plane P within 10% of the axial chord of the strut 60A.

In each of the turbine stator vane assemblies described above the struts have a thickness to chord ratio of 30 to 35%, the stator vanes have a thickness to chord ratio of 15 to 25%.

In each of the turbine vane assemblies described above the difference in chord length of the stator vanes is summarised as flows, the adjacent stator vane in the direction of flow turning has an axial chord length of 50% to <100% of the axial chord length of the previous stator vane. Alternatively, in progressing from the stator vane nearest to the pressure surface of one of the struts to the stator vane nearest the suction surface of the other strut the axial chord length of each vane is 50% to <100% of the axial chord length of the previous stator vane.

In each of the turbine stator vane assemblies described above the stator vanes 60 have an exit angle at their trailing edges, the struts 60 have an exit angle at their trailing edges 78 and the stator vanes 62 and the struts 60 have the same exit angle. However, the exit angles may be similar to a tolerance of +/−2°. This is to ensure that the profile losses are minimised in each of the passages between the struts so that each of the passages passes the flow at the same flow angle, at the same pressure and the same pressure or as near as possible.

Although the present disclosure has referred to the circumferential spacing between adjacent struts being substantially the same it is possible that the circumferential spacing, e.g. circumferential distance or circumferential angle, between some of the adjacent struts is different to, less than or greater than, the circumferential spacing between the remainder of the struts.

FIG. 15 shows another turbine stator vane assembly 23J according to the present disclosure and comprises a plurality of radially extending and circumferentially arranged struts 60 and a plurality of radially extending and circumferentially arranged stator vanes 62 mounted on radially inner and outer platforms 64 and 66. The struts 60 and the stator vanes 62 are aerofoil in shape. Each stator vane 62 has a leading edge 68, a trailing edge 70, an axial chord length CL, a pressure surface 72 and a suction surface 74 and each strut 60 has a leading edge 76, a trailing edge 78, an axial chord length CS, a pressure surface 80 and a suction surface 82. The pressure surface 72 of each stator vane 62 extends from the leading edge 68 to the trailing edge 70 and the suction surface 74 extends from the leading edge 68 to the trailing edge 70. The pressure surface 80 of each strut 60 extends from the leading edge 76 to the trailing edge 78 and the suction surface 82 extends from the leading edge 76 to the trailing edge 78. The axial chord length CS of the struts 60 is greater than the axial chord length CL of the stator vanes 62. Each stator vane 62 is arranged between an adjacent pairs of struts 60. It is to be noted that the struts 60 have the same axial chord length CS. One or more of the struts 60 have services 61 extending there-through and it is to be noted that both the struts 60 and the stator vanes 62 are aerofoil in shape. The services 61 may be a pipe for the supply of lubricant, e.g. oil, a duct for a supply of coolant, e.g. air, or an electric cables etc.

It is to be noticed the struts 60 have the same actual chord length and the struts 60 have a greater actual chord length than the stator vanes 62.

For at least one, preferably each, stator vane 62 the ratio of the circumferential spacing $O_A$ between the trailing edge 70 of the stator vane 62 to the trailing edge 78 of the pressure surface 80 of one of the adjacent struts 60A to the circumferential spacing $I_A$ between the leading edge 68 of the stator vane 62 to the pressure surface 80 of one of the adjacent struts 60A is less than the ratio of the circumferential spacing $O_B$ between the trailing edge 70 of the stator vane 62 to the trailing edge 78 of the suction surface 82 of the other of the adjacent struts 60B to the circumferential spacing $I_B$ between the leading edge 68 of the stator vane 62 to the suction surface 82 of the other of the adjacent struts 60B.

For at least one, preferably for each, stator vane 62 the circumferential spacing $O_A$ between the trailing edge 70 of the stator vane 62 to the trailing edge 78 of the pressure surface 80 of one of the adjacent struts 60A is less than the circumferential spacing $O_B$ between the trailing edge 70 of the stator vane 62 to the trailing edge 78 of the suction surface 82 of the other of the adjacent struts 60B.

The turbine stator vane assembly may be a high pressure turbine stator vane assembly, an intermediate pressure turbine stator vane assembly or a low pressure turbine stator vane assembly.

The turbine stator vane assembly may be provided with a cooling arrangement to cool the turbine stator vane assembly.

The radially inner platform and/or the radially outer platform of the turbine stator vane assembly may be contoured circumferentially to reduce end wall losses of the turbine stator vane assembly. The radially outer platform of the turbine stator vane assembly may increase in radius from the upstream end of the platform to the downstream end of the platform of the turbine stator vane assembly. The radially inner platform and the radially outer platform of the turbine stator vane assembly may increase in radius from the upstream end of the platform to the downstream end of the platform of the turbine stator vane assembly, especially for an intermediate pressure turbine stator vane assembly.

Although the present disclosure has referred to a gas turbine stator vane assembly it is equally applicable to a turbomachine stator vane assembly.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A turbine stator vane assembly comprising a plurality of circumferentially arranged struts and a plurality of circumferentially arranged stator vanes, each stator vane having a leading edge, a trailing edge and a chord length, each strut having a leading edge, a trailing edge, a chord length, a pressure surface and a suction surface, the chord length of the struts being greater than the chord length of the stator vanes, the stator vanes being arranged in groups, each group of stator vanes being arranged between an adjacent pair of struts, each group of stator vanes comprising a plurality of stator vanes, wherein in at least one group of stator vanes the chord length of the stator vane nearest to the pressure surface of one of the adjacent struts is greater than the chord length of the stator vane nearest to the suction surface of the other of the adjacent struts, and in the at least one group of stator vanes the chord length of the stator vanes progressively decreases from the stator vane nearest to the pressure surface of one of the adjacent struts to the stator vane nearest to the suction surface of the other of the adjacent struts.

2. The turbine stator vane assembly as claimed in claim 1 wherein in each group of stator vanes the chord length of the stator vane nearest to the pressure surface of one of the adjacent struts is greater than the chord length of the stator vane nearest to the suction surface of the other of the adjacent struts.

3. The turbine stator vane assembly as claimed in claim 1 wherein a stator vane in a group of stator vanes has a different chord length to the other stator vanes in that group of stator vanes.

4. The turbine stator vane assembly as claimed in claim 1 wherein in each group of stator vanes the chord length of the stator vanes progressively decreases from the stator vane nearest to the pressure surface of one of the adjacent struts to the stator vane nearest to the suction surface of the other of the adjacent struts.

5. The turbine stator vane assembly as claimed in claim 1 wherein in at least one group of stator vanes the circumferential spacing between the trailing edges of the stator vanes gradually decreases from the stator vane nearest to the pressure surface of one of the adjacent struts to the stator vane nearest to the suction surface of the other of the adjacent struts and the circumferential spacing between the trailing edge of the stator vane nearest to the pressure surface of one of the adjacent struts and the trailing edge of the one of the adjacent struts has a greater circumferential spacing.

6. The turbine stator vane assembly as claimed in claim 5 wherein in each group of stator vanes the circumferential spacing between the trailing edges of the stator vanes gradually decreases from the stator vane nearest to the pressure surface of one of the adjacent struts to the stator vane nearest to the suction surface of the other of the adjacent struts and the circumferential spacing between the trailing edge of the stator vane nearest to the pressure surface of one of the adjacent struts and the trailing edge of the one of the adjacent struts has a greater circumferential spacing.

7. The turbine stator vane assembly as claimed in claim 1 wherein each group of stator vanes comprises two stator vanes.

8. The turbine stator vane assembly as claimed in claim 1 wherein each group of stator vanes comprises four stator vanes, each third stator vane is positioned circumferentially between the stator vane nearest to the pressure surface of one of the adjacent struts and the stator vane nearest to the suction surface of the other of the adjacent struts, each third stator vane has a chord length less than the chord length of the stator vane nearest to the pressure surface of the one of the adjacent struts and has a chord length greater than the chord length of the stator vane nearest to the suction surface of the other of the adjacent struts, each fourth stator vane is positioned circumferentially between the third stator vane and the stator vane nearest to the suction surface of the other of the adjacent struts, each fourth stator vane has a chord length less than the chord length of the third stator vane and has a chord length greater than the chord length of the stator vane nearest to the suction surface of the other of the adjacent struts.

9. The turbine stator vane assembly as claimed in claim 8 wherein the circumferential spacing between the trailing edge of the third stator vane and the trailing edge of the stator vane nearest to the pressure surface of one of the adjacent struts is greater than the circumferential spacing between the trailing edge of the third stator vane and the trailing edge of the fourth stator vane, the circumferential spacing between the trailing edge of the third stator vane and the trailing edge of the fourth stator vane is greater than the circumferential spacing between the trailing edge of the fourth stator vane and the trailing edge of the stator vane nearest to the pressure surface of one of the adjacent struts.

10. The turbine stator vane assembly as claimed in claim 1 wherein each group of stator vanes comprises five stator vanes, each third stator vane is positioned circumferentially between the stator vane nearest to the pressure surface of one of the adjacent struts and the stator vane nearest to the suction surface of the other of the adjacent struts, each third stator vane has a chord length less than the chord length of the stator vane nearest to the pressure surface of the one of the adjacent struts and has a chord length greater than the chord length of the stator vane nearest to the suction surface of the other of the adjacent struts, each fourth stator vane is positioned circumferentially between the third stator vane and the stator vane nearest to the suction surface of the other of the adjacent struts, each fourth stator vane has a chord length less than the chord length of the third stator vane and has a chord length greater than the chord length of the stator vane nearest to the suction surface of the other of the adjacent struts, each fifth stator vane is positioned circumferentially between the fourth stator vane and the stator vane nearest to the suction surface of the other of the adjacent struts, each fifth stator vane has a chord length less than the chord length of the fourth stator vane and has a chord length greater than the chord length of the stator vane nearest to the suction surface of the other of the adjacent struts.

11. The turbine stator vane assembly as claimed in claim 10 wherein the circumferential spacing between the trailing edge of the third stator vane and the trailing edge of the stator vane nearest to the pressure surface of one of the adjacent struts is greater than the circumferential spacing between the trailing edge of the third stator vane and the trailing edge of the fourth stator vane, the circumferential spacing between the trailing edge of the third stator vane and the trailing edge of the fourth stator vane is greater than the circumferential spacing between the trailing edge of the fourth stator vane and the trailing edge of the fifth stator vane, the circumferential spacing between the trailing edge of the fourth stator vane and the trailing edge of the fifth stator vane is greater than the circumferential spacing between the trailing edge of the fifth stator vane and the stator vane nearest to the pressure surface of one of the adjacent struts.

12. The turbine stator vane assembly as claimed in claim 1 wherein in at least one group of stator vanes the ratio of the circumferential distance between the trailing edge of the stator vane nearest the pressure surface of one of the adjacent struts to the trailing edge of one of the adjacent struts to the circumferential distance between the leading edge of the stator vane nearest the pressure surface of one of the adjacent struts to the pressure surface of one of the adjacent struts is less than the ratio of the circumferential distance between the trailing edge of the stator vane nearest the suction surface of the other of the adjacent struts to the trailing edge of the other of the adjacent struts to the circumferential distance between the leading edge of the stator vane nearest the suction surface of the other of the adjacent struts to the suction surface of the other of the adjacent struts.

13. The turbine stator vane assembly as claimed in claim 12 wherein in each group of stator vanes the ratio of the circumferential distance between the trailing edge of the stator vane nearest the pressure surface of one of the adjacent struts to the trailing edge of one of the adjacent struts to the circumferential distance between the leading edge of the stator vane nearest the pressure surface of one of the adjacent struts to the pressure surface of one of the adjacent struts is less than the ratio of the circumferential distance between the trailing edge of the stator vane nearest the suction surface of the other of the adjacent struts to the trailing edge of the other of the adjacent struts to the circumferential distance between the leading edge of the stator vane nearest the suction surface of the other of the adjacent struts to the suction surface of the other of the adjacent struts.

14. The turbine stator vane assembly as claimed in claim 1 wherein the trailing edges of the stator vanes and the trailing edges of the struts are arranged in a common plane arranged perpendicular to an axis of the stator vane assembly.

15. The turbine stator vane assembly as claimed in claim 1 wherein the stator vanes have an exit angle at their trailing edges, the struts have an exit angle at their trailing edges and the stator vanes and the struts have the same exit angle.

16. The turbine stator vane assembly as claimed in claim 15 wherein the turbine stator vane assembly is a gas turbine stator vane assembly.

17. The turbine stator vane assembly as claimed in claim 1 wherein the circumferential spacing between adjacent struts is substantially the same.

18. The turbine stator vane assembly as claimed in claim 1 wherein the struts have the same chord length.

19. The turbine stator vane assembly as claimed in claim 1 wherein the turbine stator vane assembly is a turbomachine stator vane assembly.

20. A turbine stator vane assembly comprising a plurality of circumferentially arranged struts and a plurality of circumferentially arranged stator vanes, each stator vane having a leading edge, a trailing edge and a chord length, each strut having a leading edge, a trailing edge, a chord length, a pressure surface and a suction surface, the chord length of the struts being greater than the chord length of the stator vanes, the stator vanes being arranged in groups, each group of stator vanes being arranged between an adjacent pair of struts, each group of stator vanes comprising a plurality of stator vanes, wherein in at least one group of stator vanes the chord length of the stator vane nearest to the pressure surface of one of the adjacent struts is greater than the chord length of the stator vane nearest to the suction surface of the other of the adjacent struts, and each group of stator vanes comprises three stator vanes, each third stator vane is positioned circumferentially between the stator vane nearest to the pressure surface of one of the adjacent struts and the stator vane nearest to the suction surface of the other of the adjacent struts, each third stator vane has a chord length less than the chord length of the stator vane nearest to the pressure surface of the one of the adjacent struts and has a chord length greater than the chord length of the stator vane nearest to the suction surface of the other of the adjacent struts.

21. The turbine stator vane assembly as claimed in claim 20, wherein the circumferential spacing between the trailing edge of the third stator vane and the trailing edge of the stator vane nearest to the pressure surface of one of the adjacent struts is greater than the circumferential spacing between the trailing edge of the third stator vane and the trailing edge of the stator vane nearest to the pressure surface of the other of the adjacent struts.

22. A turbine stator vane assembly comprising a plurality of circumferentially arranged struts and a plurality of circumferentially arranged stator vanes, each stator vane having a leading edge, a trailing edge and a chord length, each strut having a leading edge, a trailing edge, a chord length, a pressure surface and a suction surface, the chord length of the struts being greater than the chord length of the stator vanes, the stator vanes being arranged in groups, each group of stator vanes being arranged between an adjacent pair of struts, each group of stator vanes comprising a plurality of stator vanes, wherein in at least one group of stator vanes the chord length of the stator vane circumferentially adjacent to the stator vane nearest to the suction surface of one of the adjacent struts is greater than the chord length of the stator vane nearest to the suction surface of the one of the adjacent struts.

* * * * *